Patented Mar. 20, 1923.

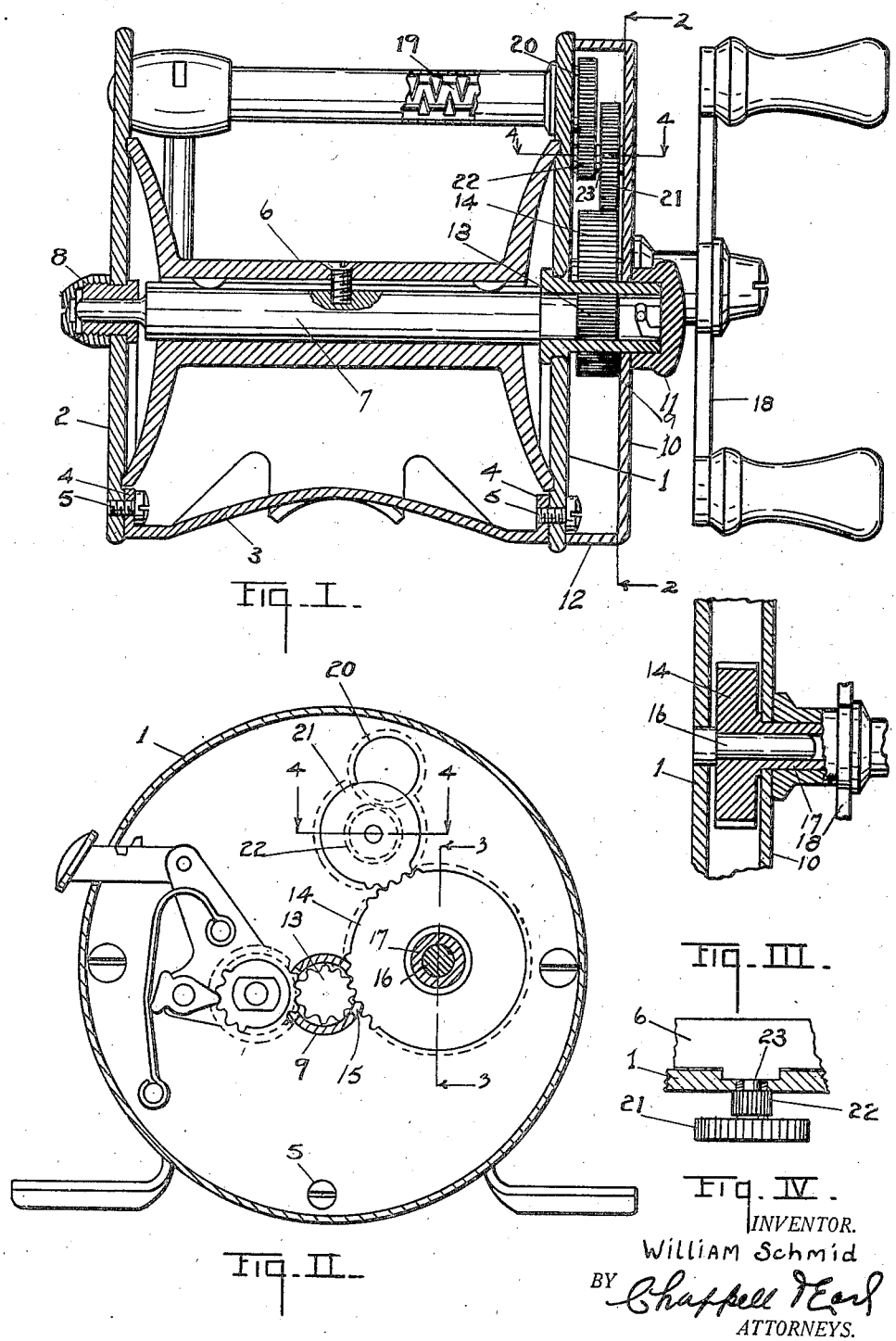

1,448,871

UNITED STATES PATENT OFFICE.

WILLIAM SCHMID, OF BRONSON, MICHIGAN.

FISHLINE REEL.

Original application filed September 5, 1919, Serial No. 321,910. Divided and this application filed November 2, 1920. Serial No. 421,246.

*To all whom it may concern:*

Be it known that I, WILLIAM SCHMID, a citizen of the United States, residing at Bronson, county of Branch, and State of Michigan, have invented certain new and useful Improvements in Fishline Reels, of which the following is a specification.

This invention relates to improvements in fish line reels.

The main objects of this invention are:

First. To provide in a fish line reel an improved level winding mechanism which is compact and simple in structure.

Second. To provide in a fish line reel an improved level winding drive.

Further objects, and objects relating to structural details will definitely appear from the detailed description to follow.

I accomplish the objects of my invention by the devices and means described in the following specification. The invention is clearly defined and pointed out in the claims.

A structure which is the preferred embodiment of my invention is clearly illustrated in the acompanying drawing forming a part of this specification, in which:

Fig. I is a view partially in vertical longitudinal section of a fish line reel embodying the features of my invention.

Fig. II is a transverse section on a line corresponding to line 2—2 of Fig. I.

Fig. III is a detail view partially in section on a line corresponding to line 3—3 of Fig. II.

Fig. IV. is a detail view partially in section on a line corresponding to line 4—4 of Fig. II.

In the drawing similar reference characters refer to similar parts throughout the several views, and the sectional views are taken looking in the direction of the little arrows at the ends of the section lines.

Referring to the drawing, the frame of my improved reel comprises the end plates 1 and 2 connected by the longitudinal frame member 3 formed of a sheet metal stamping and having end flanges 4 connected to the end members by means of the screws 5.

The frame structure is that shown in my application for Letters Patent filed September 5, 1919, Serial No. 321,910, my present application being a division of such application.

The spool 6 is provided with a shaft 7, a bearing 8 carried by the end member 2 is provided for one end of the shaft and a tubular bearing 9 carried by the end member 1 is provided for the other end of the shaft.

The tubular bearing 9 projects through the head member 10 to receive the cap 11 whereby the head member is retained with its flange 12 clamped against the end member 1.

The spool shaft 7 is provided with a pinion 13 within the bearing 9. The driving gear 14 meshes with the pinion 13, the bearing member 9 being provided with an opening 15 permitting the meshing of these gears. The driving gear 14 is carried by the stub shaft 16 mounted on the end member 1 and projecting through the head member 10. The driving gear 14 is provided with a hub-like extension 17 to which the driving crank 18 is connected.

I provide a traversing screw or shaft 19, the same having bearings in the end members of the frame. The traversing shaft pinion 20 is arranged within the head chamber. This traversing shaft pinion is connected to the driving gear 14 by means of the connected pinions 21 and 22; the pinion 21 meshes with the driving gear, while the pinion 22 meshes with the traversing shaft pinion 20. The gear 21 is of substantial diameter and overlaps the pinion 20. These gears 21 and 22 are mounted on the stub shaft 23 carried by the end member 1 so that when desired the head member 10 may be removed, exposing the gearing which is entirely supported by the end member 1.

By this arrangement I provide a driving gearing for the spool and traversing shaft which is compact and drives the traversing shaft at the desired reduced speed relative to the pinion. The structure has the further advantage of being simple and economical in its parts and very easily assembled.

Having thus described my invention, what I claim as new and desire to secure by Letters Patent, is :—

1. In a fishing reel having a head chamber, a spool shaft, and a line traversing shaft :— means adapted for operating said line traversing shaft at a predetermined speed relative to said spool shaft, said means comprising a pinion on said spool shaft, a driving gear the same width as said spool shaft pinion and meshing therewith and having a gear ratio of approximately three-to-one, a pinion on said line traversing shaft, and a compound pinion having a large gear meshing with said driving gear and having a gear ratio of approximately two-to-one and a small gear meshing with said traversing shaft pinion and having approximately an equal gear ratio, the large and small gears of said compound pinion having a gear ratio of approximately two-to-one, said compound pinion and said traversing pinion being confined within parallel planes of the side walls of said driving gear pinion so that all of said gears and pinions may be housed within a comparatively narrow reel head chamber.

2. In a fishing reel having a head chamber, a spool shaft, and a line traversing shaft;—means adapted, for operating said line traversing shaft at a predetermined speed relative to said spool shaft, said means comprising a pinion on said spool shaft, a driving gear the same width as said spool shaft pinion and meshing therewith, a pinion on said line traversing shaft, and a compound pinion having a large gear meshing with said driving gear and a small gear meshing with said traversing shaft pinion, said compound pinion and said traversing pinion being confined within parallel planes of the side walls of said driving gear pinion and all of said gears and pinions having ratios which may be increased and yet be housed within a comparatively narrow reel head chamber without increasing the diameter of said head chamber.

In witness whereof, I have hereunto set my hand and seal.

WILLIAM SCHMID. [L. S.]